June 14, 1927.  
J. B. DRENNAN  
1,632,728  
AUTOMOBILE BODY SPRING CONTROL APPARATUS  
Filed Dec. 7, 1925  
2 Sheets-Sheet 1
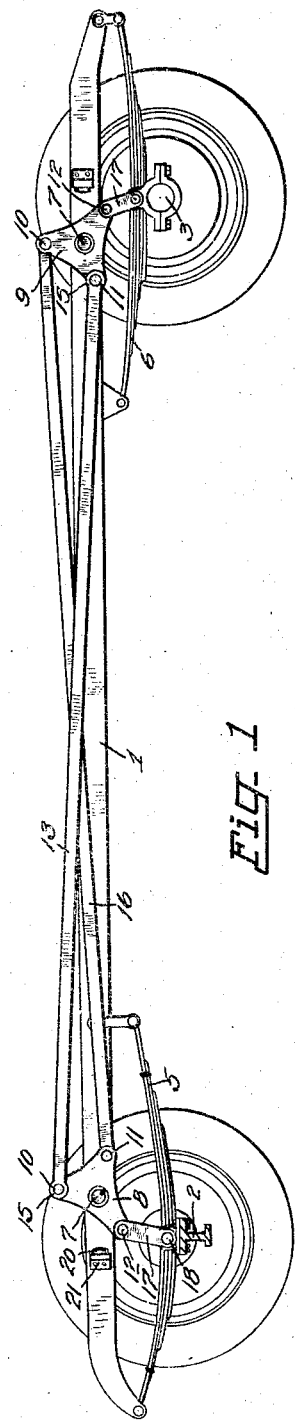
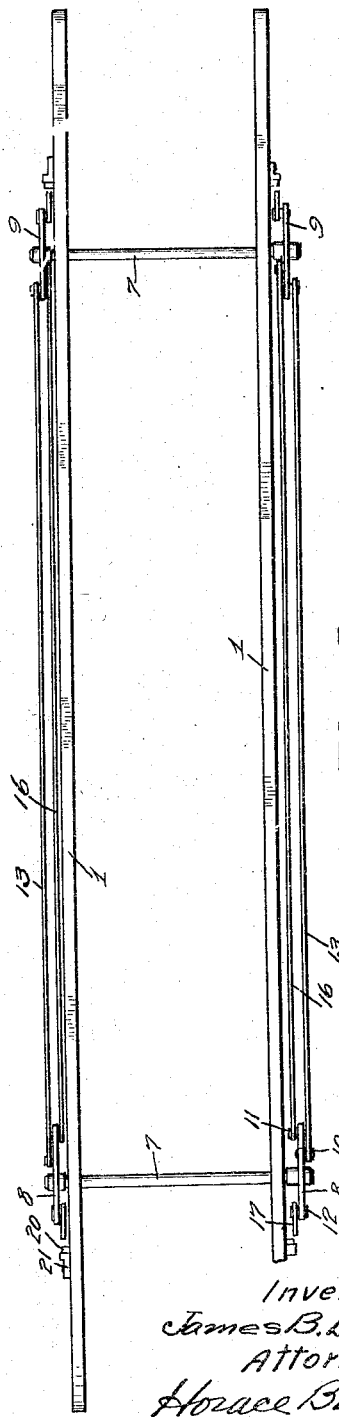
Inventor:
James B. Drennan,
Attorney,
Horace Barnes.

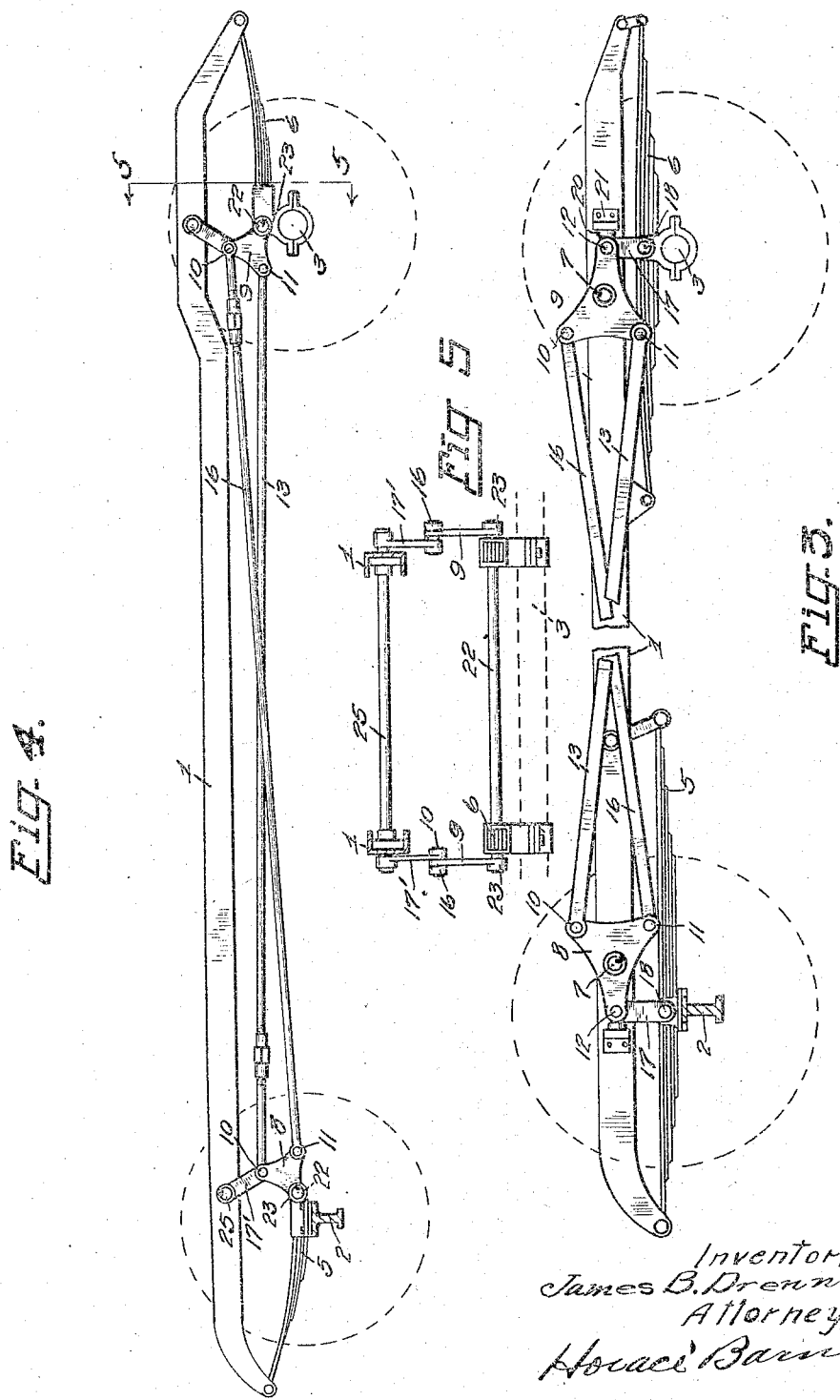

Patented June 14, 1927.

1,632,728

UNITED STATES PATENT OFFICE.

JAMES B. DRENNAN, OF PORTLAND, OREGON.

AUTOMOBILE BODY-SPRING CONTROL APPARATUS.

Application filed December 7, 1925. Serial No. 73,665.

This invention relates to improvements in apparatus for regulating the motions and action of the spring suspension devices of an automobile and their relation to the car-body.

The object of my invention is the provision of apparatus of simple construction causing the suspension springs of an automobile to function in unison for the purpose of reducing the road-shocks encountered in travel and to integrate said springs and apparatus with the body of the car to efficiently maintain the equilibrium of the car under adverse conditions.

A further object of the invention is to provide practicable means for maintaining the car-body in a normal plane with the road-bed through the controlled interconnection of the suspension-springs with each other and with the car-frame whereby the forces of compression and rebound encountered in the normal performance of the springs are distributed throughout the spring-system.

A still further object of the invention resides in the provision of a system of mutually controlled and operated springs for sustaining a platform as typified by the body of an automobile will have its weight and load borne substantially equally upon all of the springs when of equal strength, whereby any weakness present in one or more springs will be favored by the distribution of the load upon the stronger springs.

Other objects and advantages residing in my invention, and objects relating to details of construction and arrangement of parts will be readily apparent in the course of the detailed description to follow.

The accompanying drawings illustrate by way of example two forms in which my invention may be embodied, in which:

Figure 1 is a view in side elevation of an automobile chassis including an embodiment of my invention.

Fig. 2 is a plan view of Fig. 1.

Fig. 3 is a view similar to Fig. 1 upon an enlarged scale and partly broken away, illustrating the operation of the invention.

Fig. 4 is a view in side elevation of a car-chassis including a modified form of the invention.

Fig. 5 is a view partly in cross-section and partly in rear elevation on line 5—5 of Fig. 4.

Referring to said views, wherein similar reference characters indicate like parts in the several views, the reference numeral 1 indicates the longitudinal frame-members of an automobile, 2 the front axle thereof, and 3 the rear axle. Body-springs 5 and 6 are secured to said axles and to the car-body upon the opposite sides of the car and to front and rear thereof, respectively, in the usual manner.

Referring to Figs. 1 to 3, inclusive, of said views, a rod 7 is mounted for rotation transversely in the frame-members 1 at front and rear of the car adjacent the respective axles 2 and 3 and are preferably spaced somewhat towards the middle portion of the frame therefrom in each case. Upon each side of the car and as close to the respective springs as practicable a plate is keyed or secured in an analogous manner to the rods 7, numeral 8 indicating the plates upon the front rod and 9 the plates upon the rear rod. Said plates may be of triangular configuration, as shown, but not necessarily.

Said plates are mounted upon the rods 7 at their central points, approximately, and are each formed with pivotal connections 10, 11 and 12 disposed in triangular relation in each plate at points substantially equidistant from said center. Two of said pivotal connections are located towards the middle of the car from said center and with respect to their connection upon the rods, the connection 10 being above and the connection 11 below their axis of oscillation.

13 indicates a bar connected at one end by an eye 15 to an upper pivotal connection 10 of one plate upon each side of the car and similarly connected to the pivotal connection 11 at its opposite end to the corresponding plate at the opposite end of the car, thus extending in diagonal directions with respect to the car-frame and the road-bed. A similar bar 16 of identical length is pivotally secured to the connection 11 of the first named plate and extends diagonally upward to a connection with the pivot 10 of the other plate upon each side thus affording an X-connection between the forward and rear plates upon each side of the car.

The pivotal connection 12 of each plate is connected by a link 17 with a pivotal connection 18 to the respective axle or spring. Desirably, the pivotal connection 12 under an empty car or light loads will be positioned somewhat below a horizontal plane extending through the rods 7, as seen in Fig.

1. A cushion-block 20 may be mounted in a bracket 21 upon the frame adjacent each plate and is positioned to be engaged by the plate adjacent the pivotal connection 12 in its swinging movements as it passes the said horizontal plane through the rods 7 whereat the connection 12 will be approximately over the connection 18.

As stated, under light loads or when the car is empty the operative parts of the invention will assume about the positions seen in Fig. 1. Any additional load will tend to flatten the springs and by reason of the link connection 17 the plates will rock upwardly at such connection and downwardly upon the opposite sides of the rods. The keyed relation of the plates upon each end of the rods will cause them to operate in unison upon the same rod and the relatively opposite connection of the bars 13 and 16 thereto and their connection with the plates upon the opposite end of the car will cause all of the plates to rock in unison, that is to say, should the rear of the frame be depressed by reason of a load supported near the rear end the respective links 17 at the rear end will force the lower pivotal connection 11 of each plate rearwardly which by reason of the bar 16 connected at 10 to the forward plate on each side and will drag such forward plates rearwardly at their upper ends and cause the compression of the associated springs to an equal degree. Thus all of the springs are affected in about an equal amount to support the load in a balanced and distributed manner.

In the recurrent shocks encountered in the travel of an automobile over a roadbed these adjustments and compensatory factors take place continuously distributing the jars throughout the spring structure of the car and maintaining the car-body in normal parallel planes with the road-bed. Compression and rebound of the springs are felt equally upon all of the springs as they are in constant interconnection and with the body. The diagonal disposition of the bars 13 and 16 ensures that the movements of both plates of each side operate in harmony to depress or expand the springs at the two ends of the car while the keyed connection of the plates upon the rods at each end ensures that the springs at the two sides of the car are actuated similarly.

In Figs. 4 and 5 I have shown a slightly modified form of the invention in which the plates 8 and 9 are keyed at opposite ends of a rod 22 mounted for oscillation upon the spring or axle at the outermost 23 of its triangular points. The two bars 13 and 16 are pivotally connected at 10 and 11 to said plates in a similar manner to that already described in the first described form and extend diagonally for connection to the respective plates at the opposite end of the car. A link 17' substantially in form and function the aforesaid link 17 is keyed to a rod 25 mounted for oscillation in the frame and is pivotally connected at its other end to the connection 10. The mode of operation of this form of the invention is practically the same as in the first described form.

With the springs connected to operate in unison and connected to the body as provided in the present invention the entire spring structure must function as a unit and to an extent act as a check upon each other thus avoiding the necessity of shock absorbers, snubbers, and the like. No severe shocks or jolts will be communicated to the car-body as they will be distributed and neutralized and passed to the car-body in an equalized motion that will be agreeable rather than the contrary. The car-body will ride evenly upon the springs and with the roadbed so that the danger of unbalancing the car upon its wheels and overturning is practically eliminated.

Having described my invention, what I claim, is:—

1. Spring suspension control apparatus for automobiles, consisting in the combination with a body-frame of an automobile, and the springs for supporting the same, of a transverse rod mounted for rotation in said frame adjacent the axles at each end of the car, a plate keyed at each end of said rod, bars extending longitudinally of the car and pivotally connected at opposite ends to said plates upon each side of the car, respectively, and a link connecting each said plate with the adjacent axle.

2. Spring suspension control apparatus for automobiles, consisting in combination with a body-frame, and the springs for supporting the same adjacent each wheel, of a transverse rod mounted for rotation in said frame in proximity to the front and rear springs, respectively, a plate keyed to each end of each said rod, a pair of bars upon each side extending longitudinally of the car, each said bar being pivotally connected to a plate above its axis of rotation at one end and similarly connected to the other plate upon the same side below its axis of oscillation, and a link connecting each said plate upon opposite sides of its axis of oscillation to said bar-connections with the adjacent axle.

3. Spring suspension control apparatus for automobiles, consisting in combination with the body-frame of an automobile and the springs for supporting the same in proximity to each wheel, of a transverse rod mounted for rotation in said frame in proximity to the front and rear springs, respectively, a plate keyed to each end of each said rod, a pair of bars extending in oppositely diagonal directions longitudinally of the car and each pivotally connected at its opposite ends to said plate at points above and below, of its axis of rotation, and a link connecting each said plate upon the opposite side of its axis of oscillation to said bar-connections with the adjacent axle.

4. Spring suspension control apparatus for automobiles, consisting in combination with the automobile-frame and springs supporting the frame upon the front and rear axles, of a transverse rod rotatably mounted adjacent each said axle, a plate keyed at each end of each said rod, a bar upon each side of the car pivotally connected at its opposite ends to said plates above and below the plate-connection with said rods, respectively, and means connecting said frame and springs through the respective plates.

5. Spring suspension control apparatus for automobiles consisting in combination with the automobile frame and springs supporting the frame upon the front and rear axles, of a pair of rods rotatably mounted transversely of the car, a plate keyed at each end of each said rod, a link connecting said frame and springs through the respective plates, and a bar pivotally connected to a plate upon one side of the car above its axis of rotation with said rod and similarly connected to the other plate upon the same side below its axis of rotation.

JAMES B. DRENNAN.